United States Patent
Piontek et al.

(10) Patent No.: US 10,767,806 B2
(45) Date of Patent: Sep. 8, 2020

(54) REPAIR CLAMP GASKET

(71) Applicant: Total Piping Solutions, Inc., Olean, NY (US)

(72) Inventors: Daryl M. Piontek, Great Valley, NY (US); Raymond C. Minich, Bradford, PA (US)

(73) Assignee: Total Piping Solutions, Inc., Olean, NY (US)

( * ) Notice: Subject to any disclaimer, the term of this patent is extended or adjusted under 35 U.S.C. 154(b) by 0 days.

(21) Appl. No.: 16/224,100

(22) Filed: Dec. 18, 2018

(65) Prior Publication Data

US 2019/0120417 A1 Apr. 25, 2019

Related U.S. Application Data

(62) Division of application No. 15/433,324, filed on Feb. 15, 2017, now Pat. No. 10,197,204.

(60) Provisional application No. 62/298,187, filed on Feb. 22, 2016.

(51) Int. Cl.
*F16L 55/172* (2006.01)
*F16L 21/06* (2006.01)

(52) U.S. Cl.
CPC ............ *F16L 55/172* (2013.01); *F16L 21/06* (2013.01)

(58) Field of Classification Search
CPC ...... F16L 155/17; F16L 155/172; F16L 21/06
See application file for complete search history.

(56) References Cited

U.S. PATENT DOCUMENTS

| | | | |
|---|---|---|---|
| 2,776,153 A | 1/1957 | Smith | |
| 3,599,995 A | 8/1971 | Rafalski et al. | |
| 3,700,008 A | 10/1972 | Hackman | |
| 4,611,835 A | 9/1986 | Gittleman | |
| (Continued) | | | |

FOREIGN PATENT DOCUMENTS

| | | |
|---|---|---|
| DE | 3301229 A1 | 7/1984 |
| EP | 0392936 A1 | 10/1990 |
| GB | 2201218 A | 8/1988 |

OTHER PUBLICATIONS

International Search Report and Written Opinion of the International Searching Authority in corresponding International Application No. PCT/US2017/017879, completed May 16, 2017 (12 pages).

*Primary Examiner* — Robert Sandy
*Assistant Examiner* — Michael S Lee
(74) *Attorney, Agent, or Firm* — Harter Secrest & Emery LLP

(57) ABSTRACT

A clamp comprising a spanner extending across a gap between first and second longitudinally extending edges of a band clamped onto a fluid conduit having a circumference orientated about an axis; a connecting assembly configured to tighten the spanner and band to the conduit and a gasket between the band and spanner and the conduit; the gasket comprising a first circumferential seal bead protruding from an inner side of the gasket and having a circumferential length that is equal to or greater than the circumference of the conduit and at least one standalone header bead protruding from the inner side of the gasket and disposed at least partially between the spanner and the conduit and having a circumferential length that is substantially less than the circumference of the conduit.

10 Claims, 9 Drawing Sheets

(56) References Cited

U.S. PATENT DOCUMENTS

| | | | |
|---|---|---|---|
| 5,362,107 A * | 11/1994 | Bridges | F16L 21/06 |
| | | | 138/97 |
| 6,302,450 B1 | 10/2001 | Dole | |
| 7,232,160 B2 | 6/2007 | Krausz et al. | |
| 8,857,858 B2 | 10/2014 | Minich et al. | |
| 9,217,530 B2 | 12/2015 | Minich et al. | |
| 2004/0104576 A1 | 6/2004 | Krausz et al. | |
| 2012/0192963 A1* | 8/2012 | Minich | F16L 41/06 |
| | | | 137/317 |
| 2012/0193909 A1 | 8/2012 | Minich et al. | |
| 2016/0186912 A1 | 6/2016 | Park | |
| 2016/0298802 A1 | 10/2016 | Piontek et al. | |

\* cited by examiner

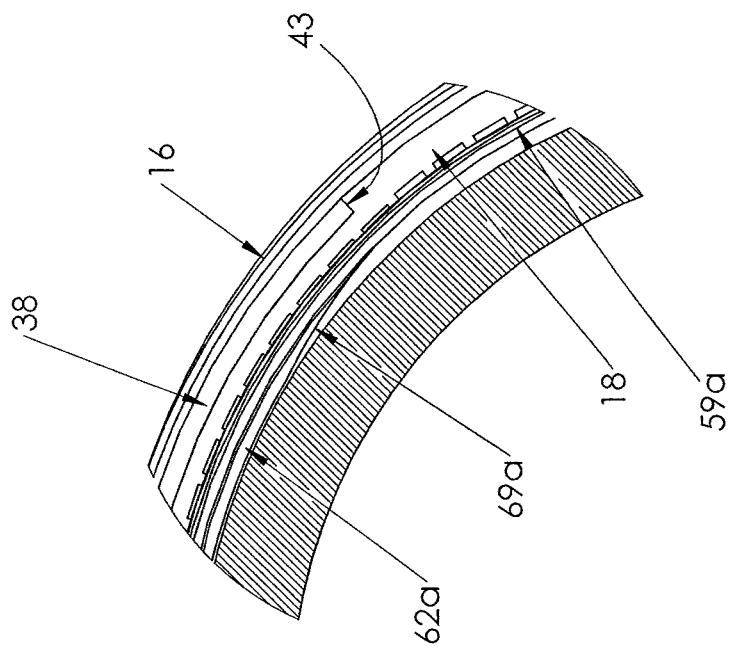
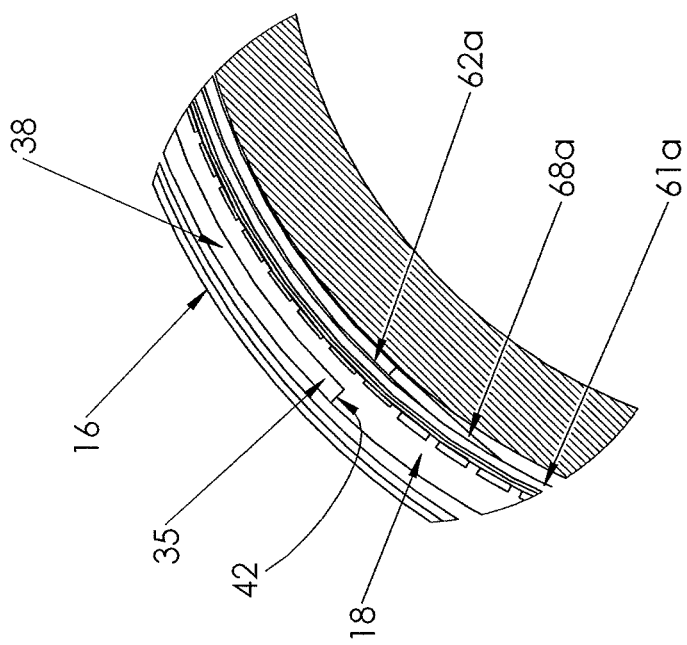
Fig. 5
Fig. 4

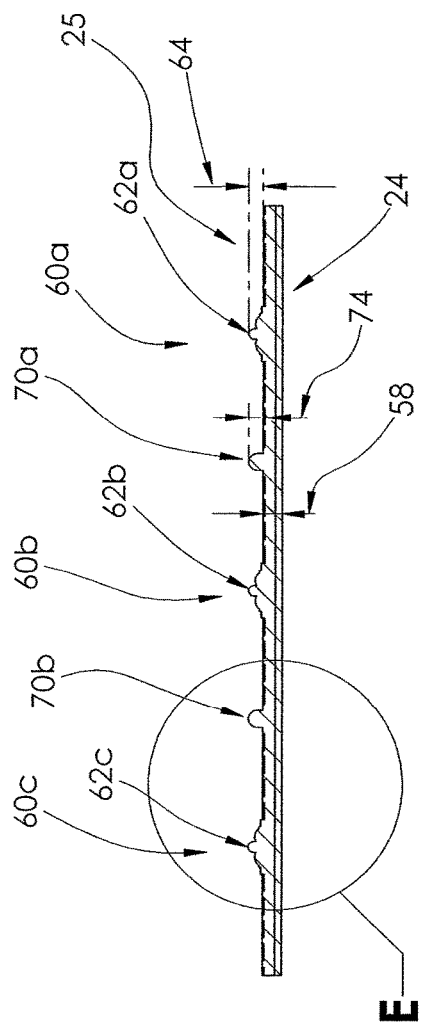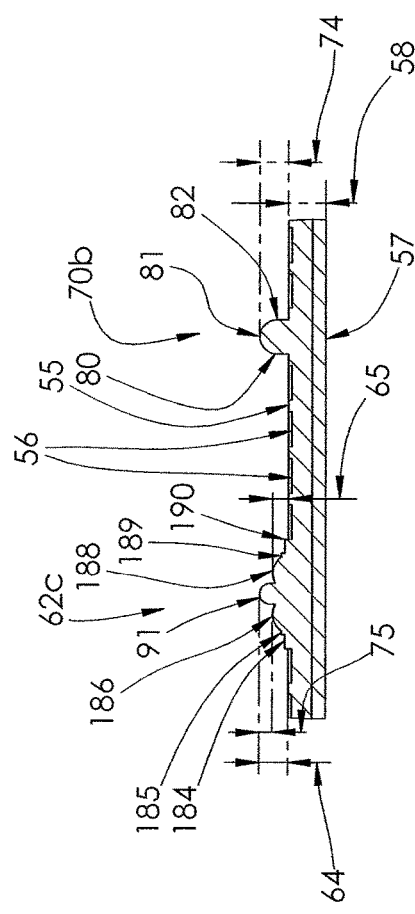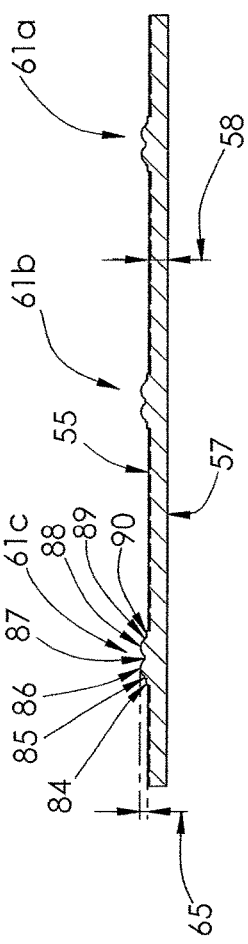

REPAIR CLAMP GASKET

RELATED APPLICATIONS

This application is a divisional of U.S. application Ser. No. 15/433,324, filed Feb. 15, 2017, which claims priority to and the benefit of U.S. Provisional Application No. 62/298,187, filed Feb. 22, 2016; both of which are incorporated herein by reference in their entireties.

TECHNICAL FIELD

The present invention relates generally to the field of repair clamps, and more particularly to an improved repair clamp gasket.

BACKGROUND ART

Repair clamps are used in the placement of pipes or for connecting the ends of pipes axially. Such clamps generally have a cylindrical body or band which encircles the subject pipe or pipe ends. Two opposed lugs are attached to the opposed edges of the cylindrically-shaped band, and the lugs are drawn towards each other by tightening bolts or fasteners. This reduces the effective internal diameter of the band, which in turn compresses an elastomeric sheet gasket that is typically placed between the band and the subject pipe. Compressing the gasket sheet seals the gasket to the pipe. To bridge the gap that is formed between the ends of the band, a spanner or bridge plate molded into or placed onto the outer surface of the gasket is employed to provide gasket compression across the gap. The spanner plate fits on the outer surface of the elastomeric sheet gasket and is compressed radially inward by the lugs along the opposed edges of the cylindrical band.

The range of diameters of piping for which a repair clamp may be used is typically fairly limited. For example, at present pipeline repair clamps have a range of about 0.3 to 0.4 inches for the diameter span of pipes that the repair clamp can effectively seal. The linear closure travel necessary for this range is only in the order of 1.20-1.25 inches.

BRIEF SUMMARY

With parenthetical reference to corresponding parts, portions or surfaces of the disclosed embodiment, merely for the purposes of illustration and not by way of limitation, an improved clamp assembly (15) is provided comprising a band (16) configured to clamp onto a fluid conduit (17) having a circumference orientated about a longitudinally extending axis (x-x); the band comprising a first longitudinally extending edge (19) and a second longitudinally extending edge (20); a spanner (38) configured to extend across a longitudinally extending gap (33) between the first longitudinally extending edge and the second longitudinally extending edge of the band; a connecting assembly (21) configured and arranged to tighten the spanner and the band to the fluid conduit from a non-actuated position to a tightened position; a gasket (18) disposed between the band and the spanner on an outer side (24) of the gasket and the main fluid conduit on an inner side (25) of the gasket; the gasket comprising at least a first circumferential seal bead (60) protruding from the inner side of the gasket and having a circumferential length (63) about the longitudinally extending axis that is equal to or greater than the circumference of the fluid conduit about the longitudinally extending axis; the gasket comprising at least one standalone header bead (70) protruding from the inner side of the gasket and disposed at least partially between the spanner and the main fluid conduit and having a circumferential length (71) about the longitudinally extending axis that is substantially less than the circumference of the fluid conduit about the longitudinally extending axis.

The gasket may comprise a first longitudinally extending edge (27) and a second longitudinally extending edge (28); the first longitudinally extending edge of the gasket circumferentially overlapping the second longitudinally extending edge of the gasket about the fluid conduit when the band is in the tightened position; and the circumferential length (71) of the standalone header bead about the longitudinally extending axis may be such that neither the first longitudinally extending edge of the gasket nor the second longitudinally extending edge of the gasket overlap the standalone header bead when the band is in the tightened position. The spanner may have a circumferential arc width (41) about the longitudinally extending axis and the circumferential length (71) of the header bead about the longitudinally extending axis may be less than or equal to one hundred twenty five percent (125%) of the circumferential arc width of the spanner. The gasket may comprise a flexible sheet (50) having an inner primary contact surface (55) on the inner side of the gasket and the header bead may comprise a first feathered end portion (72) and a second feathered end portion (73), each of which is sloped down to the primary contact surface. The gasket may comprise a recess (35) on the outer side of the gasket configured to receive at least a portion of the spanner. The flexible sheet of the gasket may comprise an array of depressions (56) in the inner primary contact surface on the inner side of the gasket.

The circumferential seal bead may comprise a first portion (59, 61) disposed directly between the band and the fluid conduit and having a first radial thickness (65); the circumferential seal bead may comprise a second further protruding portion (62) disposed at least partially between the spanner and the main fluid conduit and having a second radial thickness (64), the second radial thickness of the second portion being greater than the first radial thickness of the first portion; the second portion may have a length (66) about the longitudinally extending axis that is substantially less than the circumference of the fluid conduit about the longitudinally extending axis and the header bead may have a third radial thickness (74) and the radial thickness of the second portion may be substantially the same as the radial thickness of the header bead. The gasket may comprise a second circumferential seal bead (60b) protruding from the inner side of the gasket and having a circumferential length (63) about the longitudinally extending axis that is equal to or greater than the circumference of the fluid conduit. The header bead may extend substantially transverse to the longitudinal axis between the first circumferential seal bead and the second circumferential seal bead. The header bead, the first circumferential seal bead and the second circumferential seal bead may be substantially parallel. The spanner may be connected to the band at a first longitudinally extending connection.

In another aspect, a clamp assembly (15) is provided comprising: a band (16) configured to clamp onto a fluid conduit (17) having a circumference oriented about a longitudinally extending axis; the band comprising a first longitudinally extending edge (19) and a second longitudinally extending edge (20); a spanner (38) configured to extend across a longitudinally extending gap (33) between the first longitudinally extending edge and the second longitudinally extending edge of the band; a connecting assembly (21) configured and arranged to tighten the spanner and the band to the fluid conduit from a non-actuated position to a tightened position; a gasket (18) disposed between the band and the spanner on an outer side (24) of the gasket and the main fluid conduit on an inner side (25) of the gasket; the gasket comprising at least a first circumferential seal bead (60) protruding from the inner side of the gasket and having a circumferential length (63) about the longitudinally extending axis that is equal to or greater than the circumference of the fluid conduit about the longitudinally extending axis; the circumferential seal bead comprising a first portion (59, 61) disposed directly between the band and the fluid conduit and having a first radial thickness (65); the circumferential seal bead comprising a second protruding portion (62) disposed at least partially between the spanner and the main fluid conduit and having a second radial thickness (64); the second radial thickness of the second portion of the circumferential seal bead being greater than the first radial thickness of the first portion of the circumferential seal bead; and the second portion of the circumferential seal bead having a circumferential length (66) about the longitudinally extending axis that is substantially less than the circumference of the fluid conduit about the longitudinally extending axis.

The spanner may have a circumferential arc width (41) about the longitudinally extending axis and the circumferential length (66) of the second portion (62) of the circumferential seal bead about the longitudinally extending axis may be less than or equal to one hundred twenty five percent (125%) of the circumferential arc width of the spanner. The gasket may comprise a first longitudinally extending edge (27) and a second longitudinally extending edge (28); the first longitudinally extending edge of the gasket circumferentially overlapping the second longitudinally extending edge of the gasket about the fluid conduit when the band is in the tightened position; and the circumferential length of the second portion of the circumferential seal bead about the longitudinally extending axis may be such that neither the first longitudinally extending edge of the gasket nor the second longitudinally extending edge of the gasket overlap the second portion of the circumferential seal bead when the band is in the tightened position. The second portion of the circumferential seal bead may comprise a first feathered end portion (68) and a second feathered end portion (69), each of which is sloped down to the first portion (61, 59) of the circumferential seal bead. The gasket may comprise a recess (35) on the outer side of the gasket configured to receive at least a portion of the spanner. The second portion of the circumferential seal bead may comprise a cross-sectional profile and the cross-sectional profile may comprise a first lower rounded protrusion (186), a second lower rounded protrusion (188), and a third rounded protrusion (91) raised between the first rounded protrusion and the second rounded protrusion. The first portion of the circumferential seal bead may comprise a dual bead (86, 88) cross-sectional profile configuration. The spanner may be connected to the band at a first longitudinally extending connection.

In another aspect, a gasket (18) is provided comprising: a flexible sheet (50) having a first side (25), a second side (24), a first edge (27) and a second edge (28), the first side of the flexible sheet comprising a primary contact surface (55), at least a first circumferential seal bead (60) protruding from the primary contact surface and having a transverse seal length (63) between the first edge and the second edge, and a standalone header bead (70) protruding from the primary contact surface and having a transverse header length (71) between the first edge and the second edge that is substantially less than the transverse seal length of the first circumferential seal bead.

The flexible sheet may comprise a recess (35) on the second side of the flexible sheet configured to receive at least a portion of a spanner, the recess may have a width (36) between the first edge and the second edge and the header length of the header bead may be less than or equal to one hundred twenty five percent (125%) of the width of the recess. The header bead may comprise a first feathered end portion (72) and a second feathered end portion (73), each of which is sloped down to the primary contact surface. The flexible sheet of the gasket may comprise an array of depressions (56) in the inner primary contact surface on the inner side of the gasket. The flexible sheet of the gasket may comprise an array of depressions in the inner primary contact surface on the inner side of the gasket, the circumferential seal bead may comprise a first protruding portion (59, 61) having a first length (67b, 67a) over the array of depressions between the first edge and the second edge and a first thickness (65) above the primary contact surface, the circumferential seal bead may comprise a second protruding portion (62) having a second length (66) over the array of depressions between the first edge and the second edge and a second thickness (64) above the primary contact surface, the second thickness of the second portion being greater than the first thickness of the first portion, the length of the second portion may be substantially less than the length of the first portion, and the header bead may have a third thickness (74) above the primary contact surface and the second thickness of the second portion of the circumferential seal bead may be substantially the same as the third thickness of the header bead. The second protruding portion of the circumferential seal bead may comprise a cross-sectional profile and the cross-sectional profile may comprise a first lower rounded protrusion (186), a second lower rounded protrusion (188) and a third rounded protrusion (91) raised between the first rounded protrusion and the second rounded protrusion. The first protruding portion of the circumferential seal bead may comprise a dual bead (86, 88) cross-sectional profile configuration. The flexible sheet of the gasket may comprise a second circumferential seal bead (60b) protruding from the primary contact surface and having a transverse seal length (63) between the first edge and the second edge. The header bead may extend between the first circumferential seal bead and the second circumferential seal bead. The header bead, the first circumferential seal bead and the second circumferential seal bead may be substantially parallel.

The clamp may be configured as a tapping sleeve or a multi-paneled repair clamp, wherein the band comprises a first shell member having a first longitudinally extending edge and a second shell member having a second longitudinally extending edge, the second shell member separate from the first shell member and the first shell member having a third longitudinally extending edge and the second shell member having a forth longitudinally extending edge.

BRIEF DESCRIPTION OF THE DRAWINGS

FIG. 4 is an enlarged detailed view of the repair clamp and gasket assembly shown in FIG. 2, taken generally within the indicated circle B of FIG. 2.

FIG. 5 is an enlarged detailed view of the repair clamp and gasket assembly shown in FIG. 2, taken generally within the indicated circle C of FIG. 2.

FIG. 10 is a longitudinal vertical cross-sectional view of the gasket shown in FIG. 7, taken generally on line 10-10 of FIG. 7.

FIG. 11 is an enlarged detailed view of the gasket shown in FIG. 10, taken generally within the indicated circle E of FIG. 10.

FIG. 12 is a longitudinal vertical cross-sectional view of the gasket shown in FIG. 7, taken generally on line 12-12 of FIG. 7.

DETAILED DESCRIPTION OF THE EMBODIMENTS

Figure 1:
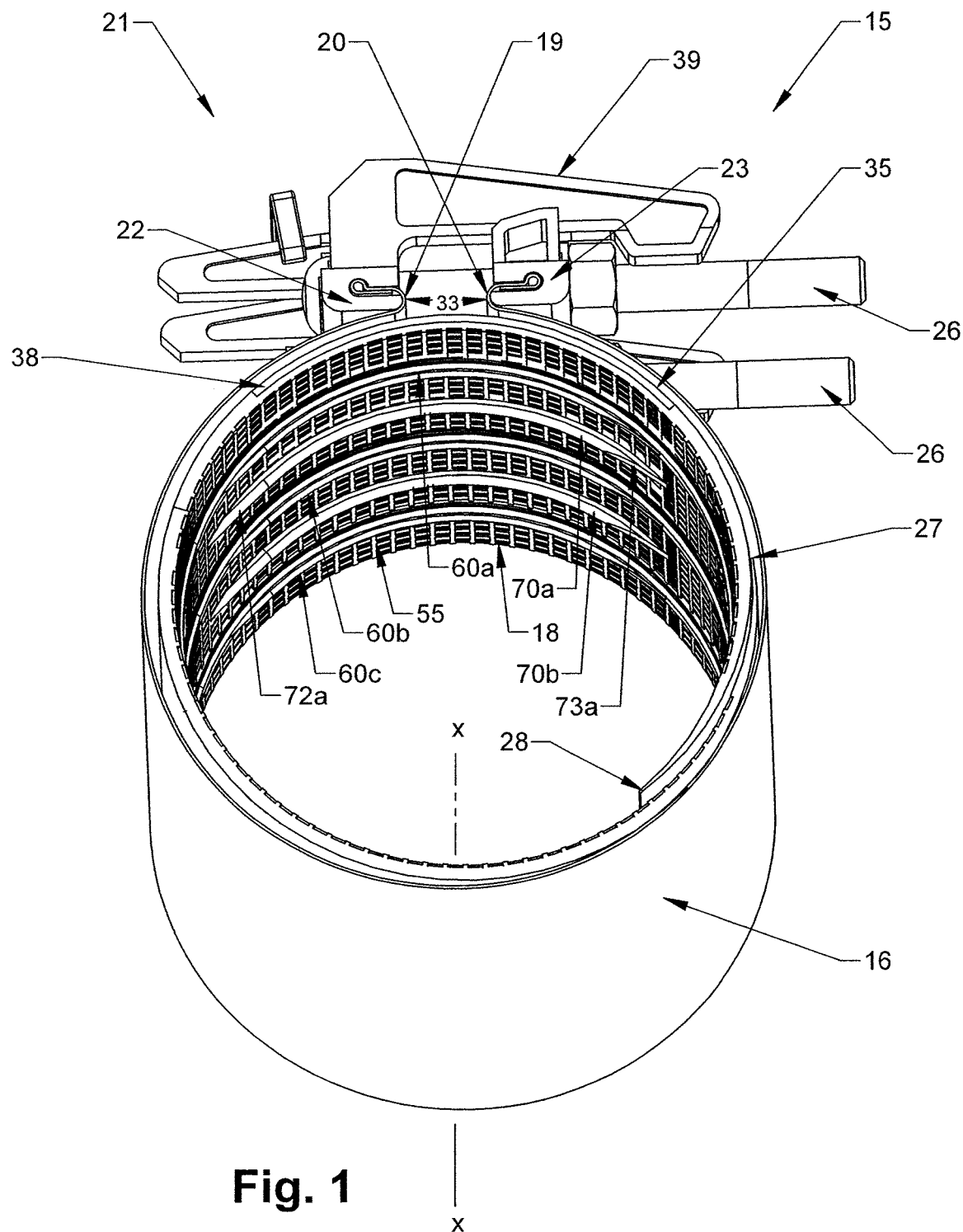
FIG. 1 is a top isometric view of an embodiment of the improved repair clamp and gasket assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
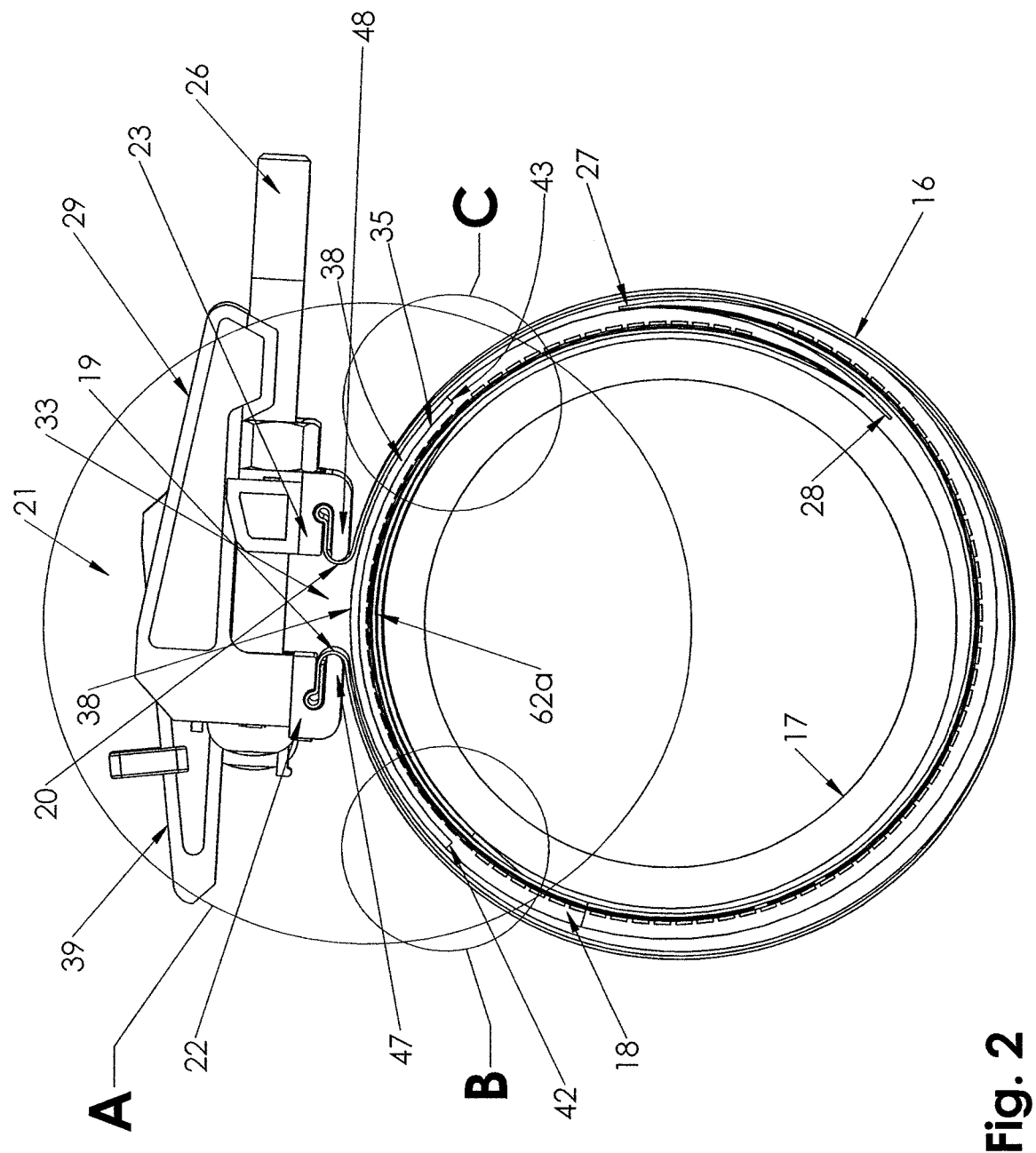
FIG. 2 is a top plan view of the repair clamp and gasket assembly shown in FIG. 1 on a fluid conduit.
Figure 3:
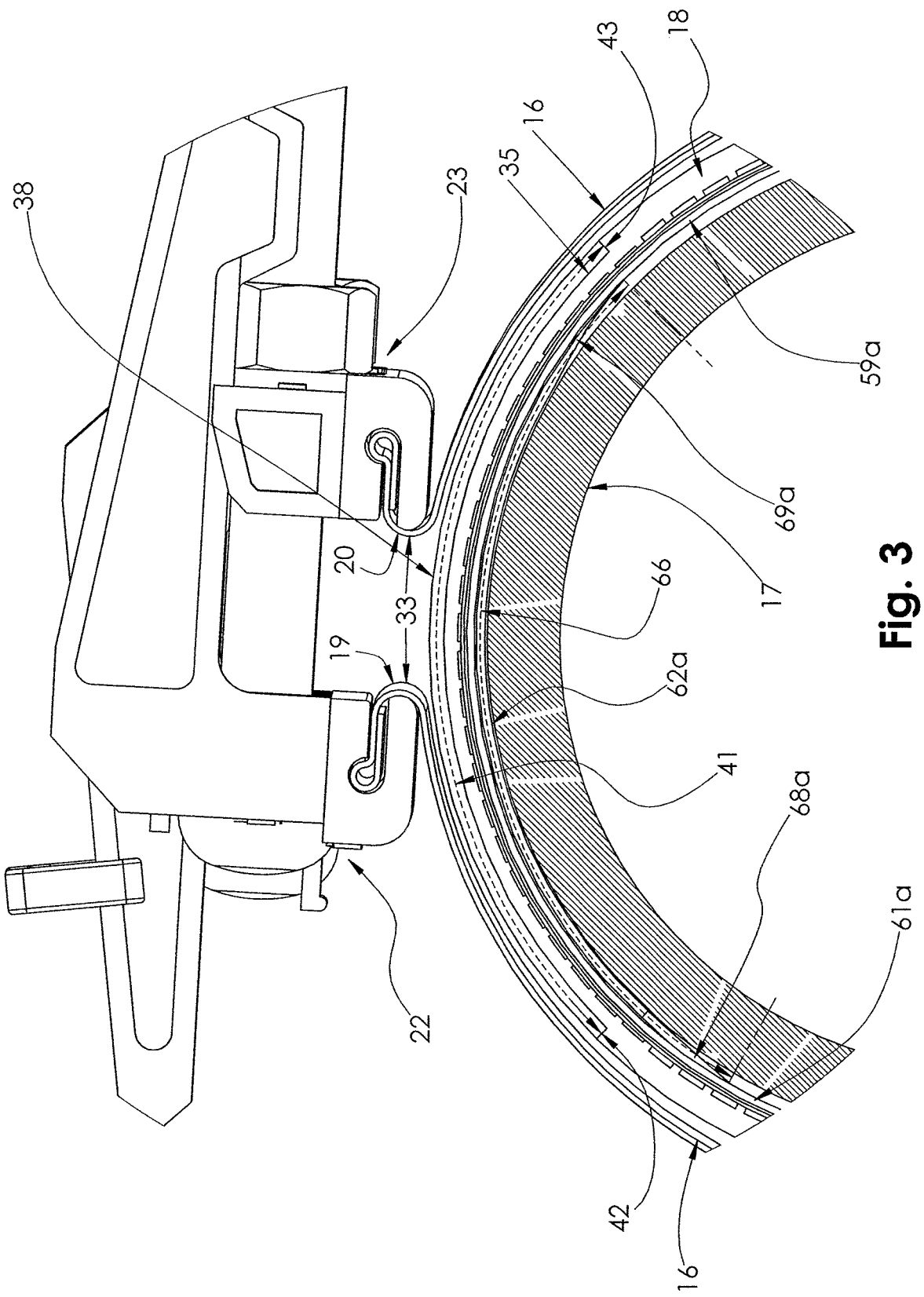
FIG. 3 is an enlarged detailed view of the repair clamp and gasket assembly shown in FIG. 2, taken generally within the indicated circle A of FIG. 2.

Referring now to the drawings, and more particularly to FIG. 1 thereof, an improved repair clamp and gasket assembly is provided, of which a first embodiment is generally indicated at 15. As shown in FIGS. 1-3, assembly 15 generally comprises band 16, which has two longitudinally extending opposed edges 19 and 20 and in operation is circumferentially disposed on the outside of pipe or fluid conduit 17, spanner 38, which in operation extends circumferentially across gap 33 between edges 19 and 20 of band 16, gasket 18, which in operation is disposed between pipe 17 and both band 19 and spanner 38, and connecting assembly 21, which in operation spans the gap between edges 19 and 20 of band 16 and is used to draw edges 19 and 20 together. Connecting assembly 21 is attached to band 16 at connectings 47 and 48 near or proximate to longitudinally extending edges 19 and 20 of band 16, respectively.

As shown, band 16 is a thin semi-cylindrical metal member configured and arranged to be tightened around pipe 17 with connecting assembly 21. Band 16 has two longitudinally extending opposed edges 19 and 20.

As described in further detail below, gasket 18 is a flexible elastomeric matte gasket sheet 50 of nominal thickness 58. Gasket 18 has specially contoured sealing features and is disposed between the inner surfaces of band 16 and spanner 38 and the outer cylindrical surface of pipe 17. Thus, gasket 18 is sandwiched between the inside semi-cylindrical surfaces of band 16 and spanner 38 and the outside cylindrical surface of conduit 17 to provide sufficient sealing force to prevent leakage of fluid. Elastic or sealing energy is imparted into assembly 15 by tightening connecting assembly 21 from a loosened or a non-actuated position to a tightened sealed position.

As shown, spanner 38 is a metallic strip that spans arc-shaped gap 33 between opposed longitudinally extending edges 19 and 20 of band 16. The interior edges and surfaces of band 16 that are in contact with spanner 38 apply a normal force or pressure that is directed radially inward toward the center axis of pipe 17, which develops the necessary sealing pressure between spanner 38 and pipe 17. Spanner 38 is designed to compress gasket 18 across gap 33 between longitudinally extending edges 19 and 20 of band 16.

In one alternative embodiment, the right side 43 of spanner plate 38 may be mechanically attached to band 16. In such embodiments, the right side 43 of spanner 38 is thereby stationary relative to lug 23 and edge 20 of band 16. The result is that lug 23 acts as a non-moving or anchored lug and spanner 38 is thereby restricted such that it does not slide or skate relative to lug 23. Opposing lug 22 and edge 19 of band 16 is intended to slide translate or slip over the outer surface of spanner 38, and thereby provide band diameter reduction and gasket compression upon the tightening of assembly 21. As bolts 26 of connecting assembly 21 are tightened, a radially orientated inward force is applied to spanner 38.

Connecting assembly 21 generally includes lug element 22, lug element 23 and bolts 26 extending there between. Lug element 22 generally comprises a lug base connected to edge 19 of band 16 at connection 47 and a plurality of longitudinally spaced bolt receiving slots or grooves. Fingers 29 are spaced longitudinally along the base of lug 22 and extend transversely towards lug 23 therefrom. Lug element 23 generally comprises a lug base connected to edge 20 of band 16 at connection 48 and a plurality of longitudinally spaced bolt hole openings extending from the left side to the right side thereof. Fingers 39 are spaced longitudinally along the base of lug 23 and extend transversely toward lug 22 therefrom. The bolt heads of bolts 26 abut against the left side of the slots in lug element 22 and extend between lugs 22 and 23. Corresponding washers and nuts are tightened on the threaded end portions of bolts 26 that extend through to the right side of the openings in lug 23, respectively, to draw opposed lug elements 22 and 23 together, thereby tightening band 16 to pipe 17.

As shown in FIGS. 1 and 2, the base of lug 22 is connected at connection 47 to band 16 proximate to longitudinally extending edge 19, which is coincident with longitudinal axis x-x of pipe 17. Similarly, the base of lug 23 is connected at connection 48 to band 16 proximate to longitudinally extending edge 20, which is coincident with longitudinal axis x-x of pipe 17. As shown, in this embodiment, band edges 19 and 20 each have a longitudinally extending P-shaped end portion and the base portions of lugs 22 and 23 include a longitudinally P-shaped slot configured and arranged to receive the P-shaped end portions of band 16. The P-shaped end portion of the band edges may thereby be slid into the P-shaped slot in the base of the respective lugs to provide a mechanical connection such that the edges of band 16 move transversely with tightening of bolts 26 and lugs 22 and 23 of connecting assembly 21. Other mechanical connections may be used. For example and without limitation, lug elements 22 and 23 may be welded to edges 19 and 20 of band 16 at connections 47 and 48, respectively.

As shown in FIGS. 1-5, gasket 18 has longitudinally extending edges 27 and 28 and a circumferential length from edge 27 to edge 28 sized to completely encircle the outside diameter of the smallest diameter fluid carrying pipe 17 for the given clamp size such that edges 27 and 28 overlap. As shown in FIGS. 1-14, gasket 18 comprises flexible elastomeric matte gasket sheet 50 having inner side 25 and outer side 24 and nominal thickness 58. Inner side 25 has master or primary matte sealing surface 55 and a plurality of specially contoured raised or thickened sealing beads protruding out from surface 55, including circumferential seal beads 60*a*, 60*b* and 60*c* and standalone header beads 70*a* and 70*b* extending transversely between edges 27 and 28. As shown, surface 55 includes multiple waffle-type cavities or depressions 56 in the surface contouring.

Outer side 24 generally includes uniform outer surface 57 and spanner recess 35 in outer surface 57. In this embodiment, spanner recess 35 is sized to receive spanner 38 such that spanner 38 may be embedded into matte gasket 18. In certain embodiments, spanner 38 lies flush with surface 57 of outer side 24 of matte gasket 18, and does not project above outer surface 57 of main gasket sheet 50. Spanner 38 has arc width 41 from left edge 42 to right edge 43 of spanner 38 transverse to axis x-x and spanner recess 35 has corresponding width 36 transverse to axis x-x.

As shown in FIG. 1, gasket 18 includes multiple transversely extending protruding or raised inner circumferential seal beads 60*a*, 60*b* and 60*c* running circumferentially and transversely to the longitudinal axis x-x of pipe 17 together with multiple transversely extending protruding or raised inner standalone header beads 70*a* and 70*b* running circumferentially and transversely to the longitudinal axis x-x of pipe 17 between and parallel to circumferential seal beads 60*a*, 60*b* and 60*c*, with standalone header bead 70*a* running between circumferential seal beads 60*a* and 60*b* and standalone header bead 70*b* running between circumferential seal beads 60*b* and 60*c*. These inner seal beads face the outer surface of fluid carrying pipe 17 to provide for increased localized gasket sealing pressure. Circumferential seal beads 60*a*, 60*b* and 60*c* and standalone header beads 70*a* and 70*b* each have a specially contoured profile, shape and relative length. These circumferential seal beads provide for improved seal performance and allow for a wider unsupported spanner 38 width 41 or span. Such wider unsupported spanner range yields a gasket design that provides for the sealing diameter range of repair clamp 15 to be up to about 0.90 inches or greater with a linear closure range of about 2.80 inches or greater.

In particular, and with reference to FIGS. 6-14, which show gasket 18 unwrapped from conduit 17 and lying flat, circumferential seal beads 60*a*, 60*b* and 60*c* each run from feathered ends 30*a*, 30*b* and 30*c*, respectively, proximate to edge 27 of gasket 18, to feathered ends 31*a*, 31*b*, and 31*c*, respectively, proximate to edge 28 of gasket 18. As shown, circumferential seal beads 60*a*, 60*b* and 60*c* are raised above inner primary contact surface 55 of sheet 50. Moving from left edge 27 of sheet 50 to right edge 28 of sheet 50, each circumferential seal bead generally includes feathered end portion 30*a-c*, in which the thickness of the bead above surface 55 gradually increases to thickness 65, first bead portion 61*a-c* having thickness 65 above primary surface 55 along its entire length 67*a*, feathered transition portion 68*a-c*, in which the thickness of the bead above surface 55 gradually increases from thickness 65 to thickness to thickness 64, thickened spanner portion 62*a-c* having thickness 64 above primary surface 55 along its entire length 66 that is greater than thickness 65 of first bead portion 61*a-c*, feathered transition portion 69*a-c*, in which the thickness of the bead above surface 55 gradually decreases from thickness 64 back to thickness 65, second bead portion 59*a-c* having thickness 65 above primary surface 55 along its entire length 67*b*, and feathered end portion 31*a-c*, in which the thickness of the bead above surface 55 gradually decreases from thickness 64 down to master surface 55 proximate to second edge 28 of sheet 50 of gasket 18. Thus, circumferential seal bead 60 comprises first bead portion 61 and second bead portion 59 each having thickness 65 and thickened or further raised spanner portion 62 having increased thickness 64 extending between bead portions 61 and 59.

Figure 6:
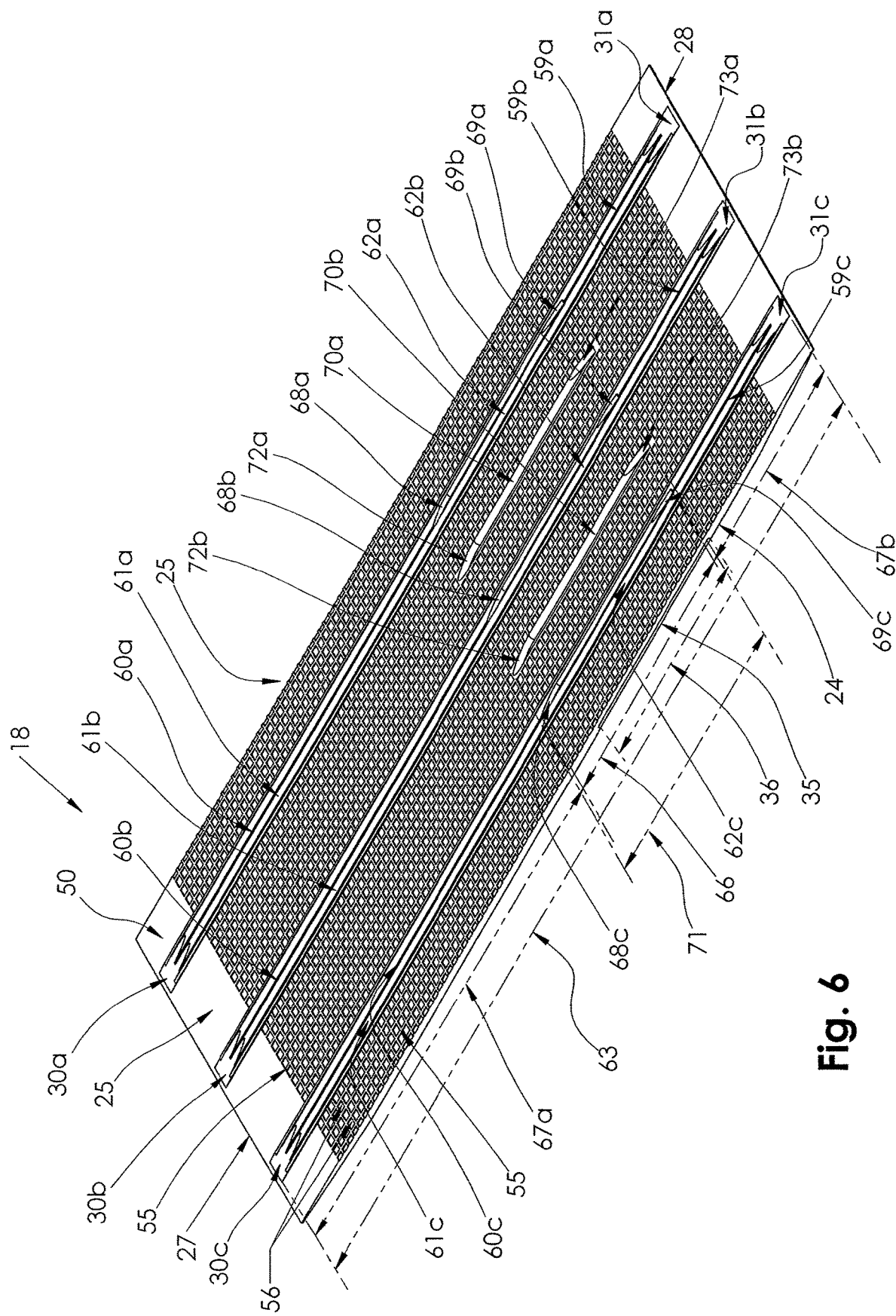
FIG. 6 is an isometric view of the gasket shown in FIG. 1.
Figure 7:
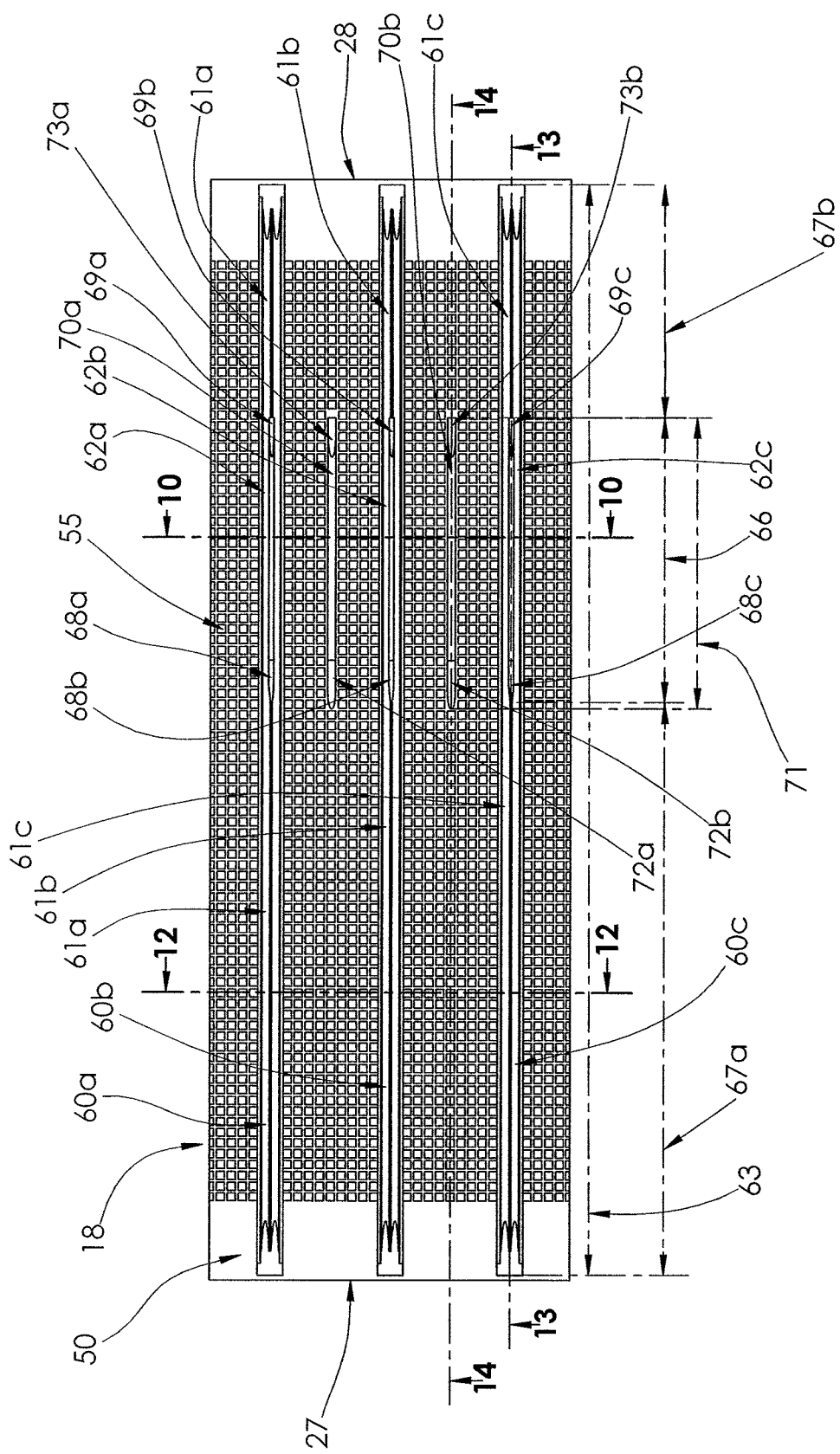
FIG. 7 is a top plan view of the gasket shown in FIG. 6.
Figure 8:
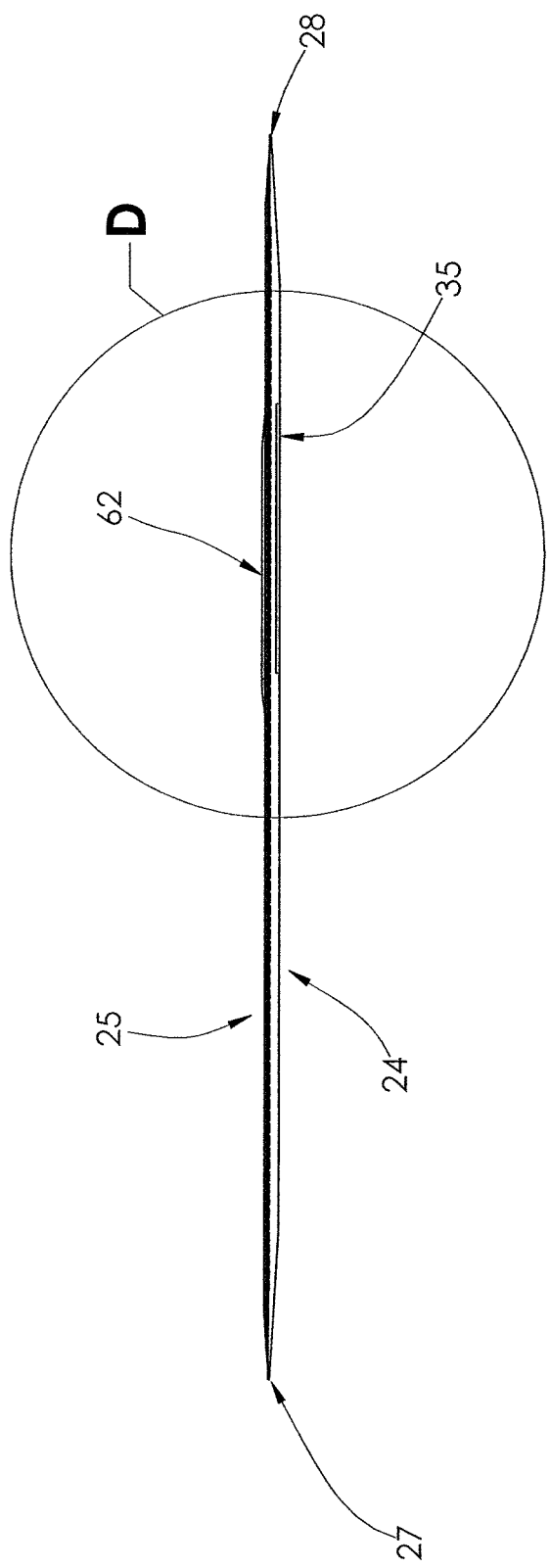
FIG. 8 is a front side view of the gasket shown in FIG. 7.
Figure 9:
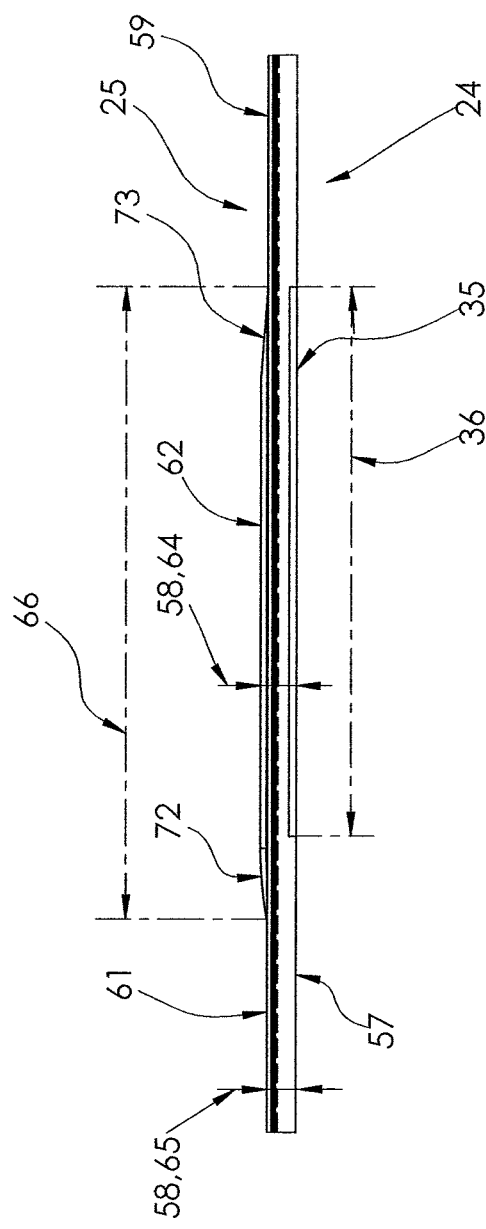
FIG. 9 is an enlarged detailed view of the gasket shown in FIG. 8, taken generally within the indicated circle D of FIG. 2.
Figure 13:
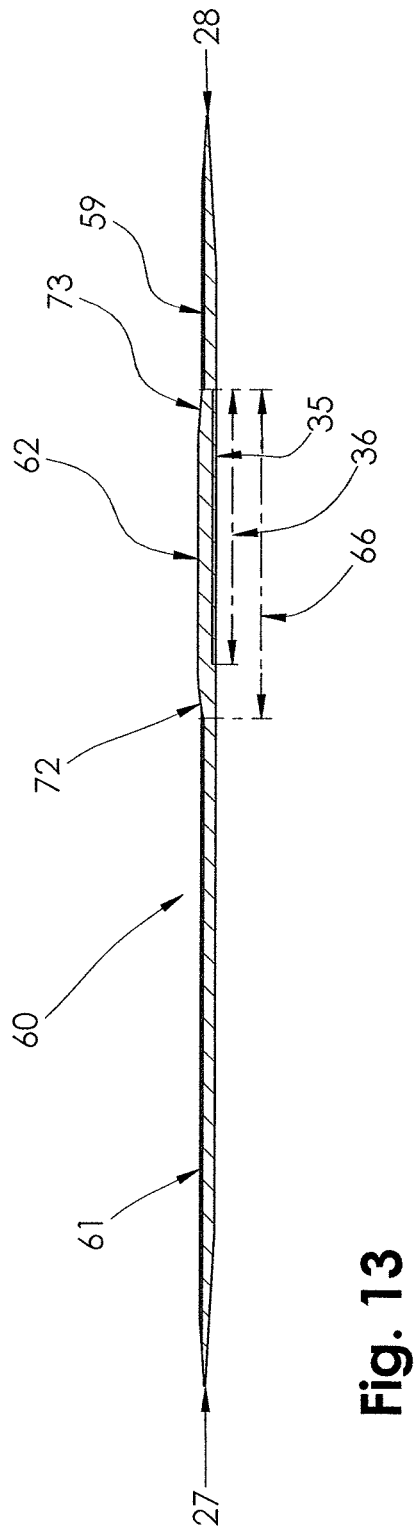
FIG. 13 is a transverse vertical cross-sectional view of the gasket shown in FIG. 7, taken generally on line 13-13 of FIG. 7.
Figure 14:
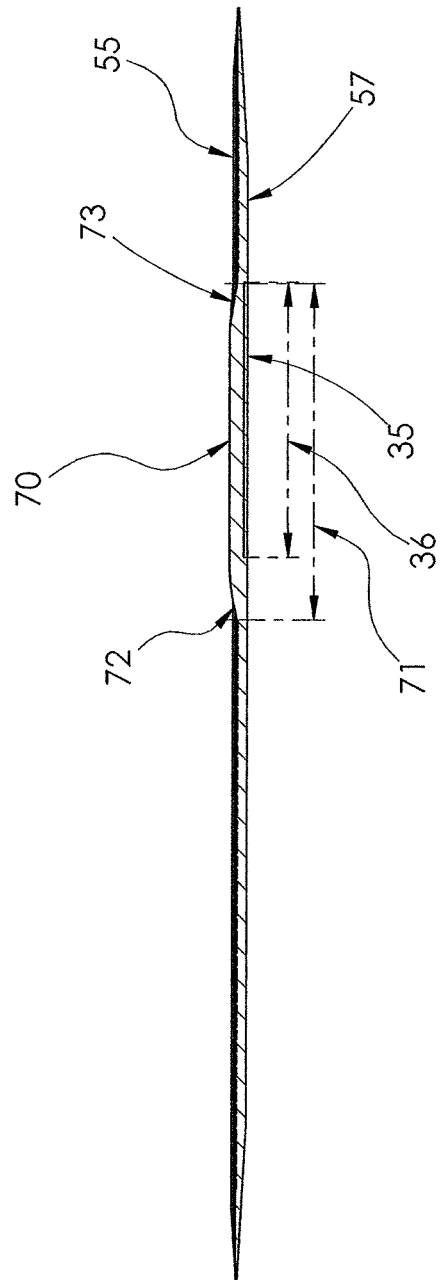
FIG. 14 is a transverse vertical cross-sectional view of the gasket shown in FIG. 7, taken generally on line 14-14 of FIG. 7.

Raised spanner portion 62*a* of circumferential seal bead 60*a* is configured to be disposed at least partially between spanner 38 and fluid conduit 17. Feathered end portion 30*a* provides a taper from primary surface 55 near edge 27 to first bead portion 61*a* of thickness 65. Feathered transition portion 68*a* in turn provides a taper from first bead portion 61*a* to spanner portion 62*a* of increased thickness 64. Feathered end portion 31*a* provides a taper from primary surface 55 near edge 26 to second bead portion 59*a* of thickness 65. Feathered transition portion 69*a* in turn provides a taper from second bead portion 59*a* to spanner portion 62*a* of increased thickness 64. As shown in FIG. 6, length 67*a* of seal bead portion 61*a* is greater than length 67*b* of seal bead portion 59*a* such that raised spanner portion 62*a* of circumferential seal bead 60*a* is positioned closer to edge 28 than edge 27 of sheet 50 of gasket 18. Circumferential seal beads 60*b* and 60*c* have the same configuration in parallel to circumferential seal bead 60*a*.

As shown in FIG. 12, each of bead portions 59*a-c* and 61*a-c* of circumferential seal beads 60*a-c* has a double o-ring pedestalled radial inwardly-facing geometry or profile. Thus, circumferential seal bead portions 59*a-c* and 61*a-c* have parallel double seal beads of semicircular cross section, raised by pedestal above main gasket sheet primary sealing surface 55. With reference to FIG. 12, the cross-sectional profile of each of seal bead portions 59*a-c* and 61*a-c* are defined, moving left to right, by first level ledge or lower pedestal 84, which is raised above primary surface 55, second level ledge or upper pedestal 85, which is raised above lower pedestal 84, first semi-circular bead 86, which is supported by and extends above upper pedestal 84 and is raised a distance 65 above surface 55, land 87 between first bead 86 and second bead 88, second semi-circular bead 88, which is raised above surface 55 to the same level as first semi-circular bead 86, second level ledge or upper pedestal 89, which supports bead 88 and is raised above surface 55 to the same level as pedestal 85, and first level ledge or lower pedestal 90, which is raised above surface 55 to the same level as pedestal 84. This profile provides a zone to flow into when actuated by pressure as band 16 is tightened to fluid carrying pipe 17.

As shown in FIGS. 10 and 11, each of portions 62*a-c* of circumferential seal beads 60*a-c* has a new triple o-ring pedestalled radial inwardly-facing geometry or profile.

Thus, circumferential seal bead portion 62 has parallel triple seal beads of semicircular cross section, raised by pedestal above the main gasket sheet primary sealing surface 55, to provide for increased seal pressure and seal reliability at spanner 38. With third raised or thickened rounded bead element 91, this profile provides additional gasket pack material to perform an improved circumferential seal around spanner 38 when assembly 21 is tightened. The profile assists in the progressive seal that occurs near spanner 38 during installation and bolt tightening. With reference to FIG. 11, the cross-sectional profile of raised spanner portions 62a, 62b and 62c are defined, moving left to right, by first level ledge or lower pedestal 184, which is raised above primary surface 55, second level ledge or upper pedestal 185, which is raised above lower pedestal 184, first semi-circular bead 186, which is supported by and extends above upper pedestal 184 and is raised a distance 65 above surface 55, center bead element 91, which is supported between and extends above both first semi-circular bead 186 and second semi-circular bead 188 and is raised a distance 64 above surface 55, second semi-circular bead 188, which is raised above surface 55 to the same level as first semi-circular bead 186, second level ledge or upper pedestal 189, which supports bead 188 and is raised above surface 55 to the same level as pedestal 185, and first level ledge or lower pedestal 190, which is raised above surface 55 to the same level as pedestal 184. Raised spanner portion 62 provides improved seal performance and allows for a wider unsupported spanner 38 width 41 or span.

With reference to FIGS. 6-14, standalone seal beads 70a and 70b each run from feathered ends 72a and 72b, respectively, to feathered ends 73a and 73b, respectively, closer to edge 28 of gasket 18 than edge 27 of gasket 18. As shown, standalone seal beads 70a and 70b are raised above inner primary contact surface 55 of sheet 50. Moving from left edge 27 of sheet 50 to right edge 28 of sheet 50, each standalone seal bead 70a-b generally includes feathered end portion 72a-b, in which the thickness of the bead above surface 55 gradually increases to thickness 74, the full header bead portion having thickness 74 above primary surface 55 along its entire length 71, and feathered end portion 73a-b, in which the thickness of the bead above surface 55 gradually decreases from thickness 74 down to master surface 55.

As shown in FIGS. 10 and 11, each of standalone seal beads 70a and 70b utilize a single o-ring radially inwardly-facing geometry or profile. Standalone seal beads 70a and 70b provide for increased seal pressure and seal reliability at spanner 38. This profile provides additional gasket pack material to perform an improved circumferential seal around spanner 38 when assembly 21 is tightened. The profile assists in the progressive seal that occurs near spanner 38 during installation and bolt tightening.

Standalone seal beads 70a-b utilize a single elevated o-ring radially inwardly-facing geometry or profile. Thus, standalone seal beads 70a and 70b have a generally U-shaped profile or elevated semi-circular cross-section, raised a distance 74 above main gasket sheet primary sealing surface 55 to provide for increased sealing pressure and seal reliability at or near spanner 38. With this additional standalone seal bead, gasket 18 provides additional gasket pack material to perform an improved seal bead around spanner 38 when assembly 21 is tightened. The profile also assists in the progressive seal that occurs during installation and bolt tightening. With reference to FIG. 11, the cross-sectional profile of each of standalone beads 70a and 70b is defined, moving left to right, by leftwardly-facing vertical surface 80, which rises vertically from primary surface 55, rightwardly-facing vertical surface 82, which rises above primary surface 55, and semi-circular head 81 extending between the upper edges of surfaces 80 and 82 and having an apex a distance 74 above primary surface 55. When wrapped around conduit 17, the cross-sectional profile of standalone beads 70a and 70b will be defined by a leftwardly-facing vertical annular surface 80, a rounded outer annular surface 81 and a rightwardly-facing vertical annular surface 82.

Standalone seal beads 70a and 70b are configured to be disposed at least partially between spanner 38 and fluid conduit 17. As shown in FIG. 6, length 71 of standalone seal beads 70a and 70b is substantially the same as length 66 of raised spanner portions 62a-c of circumferential seal beads 60a-c. In addition, standalone seal beads 70a and 70b are spaced substantially the same longitudinal distance from edge 27 on one end and edge 28 on the other end as raised spanner portions 62a-c of circumferential seal beads 60a-c. Thus, feathered end portion 72a of standalone bead 70a and feathered transition portion 68a of circumferential seal bead 60a are aligned circumferentially and feathered end portion 73a of standalone bead 70a and feathered transition portion 69a of circumferential seal bead 60a are generally aligned circumferentially. Accordingly, standalone seal beads 70a and 70b are positioned closer to edge 28 than edge 27 of sheet 50 of gasket 18. Furthermore, thickness 74 of standalone seal beads 70a and 70b is substantially the same as thickness 64 of raised spanner portions 62a-c of circumferential seal beads 60a-c. Length 71 of each of standalone seal beads 70a and 70b and length 66 of each of raised spanner portions 62a, 62b and 62c of circumferential seal beads 62a, 60b and 60c are close to the same as arc width 41 from left edge 42 to right edge 43 of spanner 38 and width 36 of spanner recess 35. Preferably, the length 71, 66 of each of standalone seal beads 70a and 70b and raised spanner portions 62a, 62b and 62c of circumferential seal beads 62a, 60b and 60c, respectively, is within one hundred twenty five percent (125%) of circumferential width 41 of spanner 38 and/or width 36 of spanner recess 35.

Feathered ends 73a and 73b of standalone seal beads 70a and 70b, respectively, and corresponding aligned feathered transition portions 68a, 68b and 68c of raised spanner portions 62a, 62b and 62c of circumferential seal beads 62a, 60b and 60c, respectively, are positioned the same distance 67b from end 28 such that, when gasket 18 is wrapped around conduit 17 as shown in FIGS. 1 and 2, edge 27 of gasket 18 circumferentially overlaps, to the outside, edge 28 of gasket 18, but edge 27 does not extend far enough beyond edge 28 so as to circumferentially overlap standalone seal beads 70a and 70b or raised spanner portions 62a, 62b and 62c of circumferential seal beads 62a, 60b and 60c. Thus, as shown in FIGS. 1-5, standalone seal beads 70a and 70b and raised spanner portions 62a, 62b and 62c of circumferential seal beads 62a, 60b and 60c extend directly between spanner 38 on outside 24 of gasket 18 and conduit 17 on inside 25 of gasket 18 without overlapping portions of gasket 18 extending there between. This spacing and length 71, 66 of standalone seal beads 70a and 70b and raised spanner portions 62a, 62b and 62c of circumferential seal beads 62a, 60b and 60c, respectively, relative to the circumference of conduit 17 and the overall length of gasket sheet 50 from edge 27 to edge 28, significantly reduces leakage and other sealing problems to provide a superior seal and an extended range clamp assembly.

Accordingly, specially placed additional standalone beads 70a-b and bead elements 62a-c have been added to repair clamp gasket 18 in the vicinity of spanner plate 38, and opposite spanner plate 38 on the conductor pipe side 25 of gasket 18, resulting in a more effective seal between gasket 18 and main conductor pipe 17 in the vicinity of spanner plate 38. The addition of tri-bead elements 62a-c overtop circumferential seal beads 60a-c and additional standalone header beads 70a-b between circumferential seal beads 60a-c increases the effective thickness of gasket 18 under spanner 38 and allows for repair clamp 15 to achieve a seal earlier in the tightening process and for a greater range of pipe 17 diameters without increasing the thickness or weight of spanner 38. Also, positioning repair clamp assembly 15 with spanner 38 directly over a leak in conduit 17 places the additional seal bead material directly over the pipe defect resulting in a quicker seal. The length 71 and 66 of shorter header beads 70a-b and bead elements 62a-c, respectively, is a function of the width 41 of spanner plate 38. These header beads may terminate (taper down to the waffle surface) coincident with the longitudinal edges 42 and 43 of spanner plate 38 or these header beads may extend and/or taper down to the waffle surface just beyond the longitudinal edges 42 and 43 of spanner plate 38, but in the vicinity of or proximate to the longitudinal edges 42 and 43 of spanner plate 38. Tri-beads 62a-c and standalone header beads 70a-b are shaped with ramped/tapered ends 68a-c, 69a-c, 72a-b and 73a-b, respectively, to conform to the pipe surface in the vicinity of spanner compression plate 38.

While this embodiment discloses a single panel pipeline repair clamp configuration, the clamp assembly may be used in other configurations or for other purposes. For example, and without limitation, the clamp assembly may be configured for use in a pipeline saddle clamp, a pipeline tapping saddle, a pipeline tapping sleeve and a multi-paneled pipeline repair clamp.

The present invention contemplates that many changes and modifications may be made. Therefore, while forms of the improved clamp assembly have been shown and described, and a number of alternatives discussed, persons skilled in this art will readily appreciate that various additional changes and modifications may be made without departing from the scope of the invention, as defined and differentiated by the following claims.

What is claimed is:

1. A gasket comprising:
   a flexible sheet having a first side, a second side, a first edge and a second edge;
   said first side of said flexible sheet comprising:
   a primary contact surface;
   at least a first circumferential seal bead protruding from said primary contact surface from a first seal end to a second seal end, and said first circumferential seal bead having a transverse seal length between said first edge and said second edge of said flexible sheet;
   a standalone header bead protruding from said primary contact surface from a first header end to a second header end, and said standalone header bead having a transverse header length between said first edge and said second edge of said flexible sheet that is substantially less than said transverse seal length of said first circumferential seal bead;
   said first seal end of said first circumferential seal bead positioned closer to said first edge of said flexible sheet than said first header end of said standalone header bead; and
   said second seal end of said first circumferential seal bead positioned closer to said second edge of said flexible sheet than said second header end of said standalone header bead.

2. The gasket set forth in claim 1, wherein said flexible sheet of said gasket comprises an array of depressions in said inner primary contact surface on said inner side of said gasket.

3. The gasket set forth in claim 1, wherein said flexible sheet of said gasket comprises a second circumferential seal bead protruding from said primary contact surface and having a transverse seal length between said first edge and said second edge.

4. The gasket set forth in claim 3, wherein said standalone header bead extends between said first circumferential seal bead and said second circumferential seal bead.

5. The gasket set forth in claim 4, wherein said standalone header bead, said first circumferential seal bead and said second circumferential seal bead are substantially parallel.

6. A gasket comprising:
   a flexible sheet having a first side, a second side, a first edge and a second edge;
   said first side of said flexible sheet comprising:
   a primary contact surface;
   at least a first circumferential seal bead protruding from said primary contact surface and having a transverse seal length between said first edge and said second edge; and
   a standalone header bead protruding from said primary contact surface and having a transverse header length between said first edge and said second edge that is substantially less than said transverse seal length of said first circumferential seal bead;
   said flexible sheet comprising a recess on said second side of said flexible sheet configured to receive at least a portion of a spanner;
   said recess having a width between said first edge and said second edge; and
   wherein said transverse header length of said standalone header bead is less than or equal to one hundred twenty five percent (125%) of said width of said recess.

7. A gasket comprising:
   a flexible sheet having a first side, a second side, a first edge and a second edge;
   said first side of said flexible sheet comprising:
   a primary contact surface;
   at least a first circumferential seal bead protruding from said primary contact surface and having a transverse seal length between said first edge and said second edge; and
   a standalone header bead protruding from said primary contact surface and having a transverse header length between said first edge and said second edge that is substantially less than said transverse seal length of said first circumferential seal bead; and
   said standalone header bead comprising a first feathered end portion and a second feathered end portion, each of which is sloped down to said primary contact surface.

8. A gasket comprising:
   a flexible sheet having a first side, a second side, a first edge and a second edge;
   said first side of said flexible sheet comprising:
   a primary contact surface;
   at least a first circumferential seal bead protruding from said primary contact surface and having a transverse seal length between said first edge and said second edge; and
   a standalone header bead protruding from said primary contact surface and having a transverse header length between said first edge and said second edge that is substantially less than said transverse seal length of said first circumferential seal bead; and said flexible sheet of said gasket comprising an array of depressions in said inner primary contact surface on said inner side of said gasket;

said first circumferential seal bead comprising a first protruding portion having a first length over said array of depressions between said first edge and said second edge and a first thickness above said primary contact surface;

said first circumferential seal bead comprising a second protruding portion having a second length over said array of depressions between said first edge and said second edge and a second thickness above said primary contact surface;

wherein said second thickness of said second protruding portion of said first circumferential seal bead is greater than said first thickness of said first protruding portion of said first circumferential seal bead;

wherein said length of said second protruding portion of said first circumferential seal bead is substantially less than said length of said first protruding portion of said first circumferential seal bead; and wherein said standalone header bead has a third thickness above said primary contact surface and said second thickness of said second protruding portion of said first circumferential seal bead is substantially the same as said third thickness of said standalone header bead.

9. The gasket set forth in claim 8, wherein said second protruding portion of said first circumferential seal bead comprises a cross-sectional profile and said cross-sectional profile comprises a first lower rounded protrusion, a second lower rounded protrusion, and a third rounded protrusion raised between said first rounded protrusion and said second rounded protrusion.

10. The gasket set forth in claim 9, wherein said first protruding portion of said first circumferential seal bead comprises a dual bead cross-sectional profile configuration.

\* \* \* \* \*